United States Patent
Doty et al.

[11] 3,820,020
[45] June 25, 1974

[54] PARTICLE STUDY APPARATUS INCLUDING AN AXIAL TRAJECTORY SENSOR

[75] Inventors: Edward N. Doty, Miami; Walter R. Hogg, Miami Lakes, both of Fla.

[73] Assignee: Coulter Electronics, Inc., Hialeah, Fla.

[22] Filed: Jan. 8, 1973

[21] Appl. No.: 321,807

[52] U.S. Cl. .......................................... 324/71 CP
[51] Int. Cl. .................................... G01n 27/00
[58] Field of Search ................................ 324/71 CP

[56] References Cited
UNITED STATES PATENTS
| | | | |
|---|---|---|---|
| 3,502,973 | 3/1970 | Coulter | 324/71 CP |
| 3,557,352 | 1/1971 | Hogg | 324/71 CP X |
| 3,668,531 | 6/1972 | Hogg | 324/71 CP X |

*Primary Examiner*—Alfred E. Smith
*Assistant Examiner*—Rolf Hille
*Attorney, Agent, or Firm*—Silverman & Cass

[57] ABSTRACT

A sensor for use with apparatus operating in accordance with the principles of the Coulter electronic particle studying device for differentiating between particles passing on axial or nearly axial paths through the aperture of the Coulter device and particles passing off center. The particle pulse duration is measured at two or more fractions of the amplitude of each individual particle pulse. The pulse durations so measured are converted to voltages which are compared with reference voltages derived from similar measurements made on previously processed particle pulses. If the duration of the particle pulse being processed is within specified tolerances of the reference voltages so derived at all of the fractional heights considered, a reconstructed pulse having the amplitude of the accepted pulse is impressed upon the output of the sensor apparatus for use in subsequent pulse height analysis apparatus. All pulses which cannot satisfy the criteria are discarded. Since only those pulses are accepted which have their durations at specified fractional amplitudes which are within a specified tolerance of the reference voltage levels, the acceptance or rejection of a particle pulse is based upon the shape and duration of said particle pulse, as referred to the criteria derived from pulses occurring in the immediate past history of the train of pulses being furnished to the sensor apparatus. The apparatus of the invention provides structure for deriving a duration-measuring pulse at each fractional amplitude, converting this signal into one which has an amplitude proportional to each fractional height duration, and then subjecting the resulting set of signals to multiple criteria of duration established by voltage levels to operate gating means automatically for rejecting the pulses having improper shapes or durations as determined by these criteria.

A preferred embodiment uses as the said reference level a voltage level which represents a chosen percentile of the duration-measuring pulses, i.e., a voltage level such that, for instance, 25 percent of the duration-measuring pulses are smaller than, and 75 percent of the duration-measuring pulses are larger than the reference level.

10 Claims, 8 Drawing Figures

PARTICLE STUDY APPARATUS INCLUDING AN AXIAL TRAJECTORY SENSOR

This is a division of application Ser. No. 132,771 filed Apr. 9, 1971, now U.S. Pat. No. 3,710,263.

CROSS-REFERENCE TO RELATED APPLICATIONS

The application herein is concerned with an improved solution to the problems attacked by the following series of copending patent applications owned by the assignee of this application, all having the same or substantially the same title as this application and identified as follows:

Case I — Ser. No. 84,440, filed Oct. 27, 1970 now U.S. Pat. No. 3,701,029;

Case II — Ser. No. 101,325, filed Dec. 24, 1970 now U.S. Pat. No. 3,700,867; and Case III — Ser. No. 113,165, filed Feb. 8, 1971.

BACKGROUND OF THE INVENTION

The field of this invention is particle analyzing apparatus and more particularly is concerned with apparatus in which studies may be made of particulate systems using the Coulter sensing principle in a manner to obtain more accurate size information than heretofore achieved.

The Coulter sensing principle is disclosed in U.S. Pat. No. 2,656,508 issued Oct. 20, 1953 to Wallace H. Coulter. According to this principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been known that "long" apertures can produce results which are superior to short apertures insofar as size measurements are concerned, if the bandwidths of the associated amplifiers are reduced accordingly. A long aperture may be considered one in which the length is greater than the diameter. The usual Coulter aperture is relatively short, that is, its length is the same as or less than its diameter.

The reason for better size information with long apertures is that the electrical field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out that current paths other than the axial path are supplied from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

Another phenomenon is important to consider, according to this invention. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

The prior art has recognized the problem involved in the use of the Coulter apparatus for sizing studies, but so far as is known, there has been no satisfactory solution. One attempt involved releasing the particles in a suspension from a focussed source ahead of the aperture; but this involved the use of two apertures and the inability to illuminate and view the aperture during the process.

The use of long apertures poses too many problems to make the same practical. The long aperture has less sensitivity. It adds resistance to the effective aperture which generates noise tending to mask the signals. Microphonic modulation of the aperture is also increased. The long aperture is more likely to have coincident particles in it, giving rise to counting and sizing errors. The long aperture is more likely to become blocked by debris and is not as easy to clear as a short aperture. The flow rate of long apertures is decreased because of increased resistance to flow, thus decreasing the time for making any given studies.

The basic problems which are described above are solved in a fairly simple and straightforward manner by the copending application Case I. This application teaches the defining of limits of duration between which the duration of a particle pulse must fall to be accepted by the apparatus. The specific structures and methods of that copending application disclose measuring the duration at a predetermined fractional amplitude of the pulse and then comparing this measured pulse with manually established duration criteria, the apparatus being either of the analog or digital form.

Copending application Case II is an improvement on the basic structure in that an automatic memory device is utilized which responds to the duration of previously processed signals to keep itself adjusted to a certain duration level against which subsequent pulses can be measured. Thus the need for manual adjustments is eliminated.

Copending application Case III teaches the measurement of the duration of the particle pulse between more definitely established points. In one version, the duration of the particle pulse is measured from its peak to a fractional part of its amplitude measured on its trailing edge, and in another version the duration of the particle pulse is measured from its point of maximum slope on its leading edge to the point of maximum slope of its trailing edge. The criteria against which such durations could be measured could be established by any of the methods taught in the two copending applications, Case I and Case II.

The application herein utilizes the basic concept as taught in several of the copending applications but provides substantial improvement thereon. This improvement relates to the acceptance or rejection of pulses on the basis of their shape and duration. Instead of making the duration measurement at a single level which is a percentage of the amplitude of the pulse, the measurement is made at a plurality of levels, and unless the criteria established for all levels is met, the pulse is discarded. This has the effect of further purifying the pulses which pass to the pulse height analyzing equipment which follows the sensor. Eliminated are odd-shaped pulses which might have met the criterion of duration measurement at one level but are not desirable because of such unusual shape indicating that their amplitudes are not truly representative of the size of the particles producing the same.

In order to appreciate the nature of the invention herein, one must consider the nature of the Coulter aperture and the signals which are produced when particles pass through the same.

The popular reference to a Coulter aperture which is used in discussions of the phenomena which are produced actually should be more explicit. The best way to describe the transducing nature of the Coulter aperture is to refer to a sensing zone. This sensing zone is defined by the equipotential surfaces that are produced in the electrolyte by the presence of the aperture current and its presence is manifested by the signal that a particle will produce in passing through the zone. Thus, the Coulter aperture really consists of the electrolyte within the passage and a bulge at the entrance and exit to the passageway. All of this electrolyte in the sensing zone comprises an impedance whose total value changes with the presence of a particle in the zone, the amount of the change being dependent upon the location of the particle. In each of the bulges the current distribution is low at the center and increases closer to the corners of the passageway. The axially moving particle produces a minimum change in impedance at the beginning of the zone and this increases to a maximum in the center of the passageway where the current density is most uniform and the greatest along that particular path, followed by a substantially symmetrical decrease, producing the well-known particle pulse as the resulting signal.

It has been found that the relationship of amplitude of the particle pulse and the size of the particle is substantially linear for optimum conditions of use of the Coulter aperture. This principle has come to be known as the Coulter principle. It holds for conditions where the diameter of the particle is less than about 10 percent of the diameter of the aperture passageway. Where the diameter of the particle is greater than 10 percent, the linearity suffers. Accordingly, it is understood in most size studies that the particles are expected to be considerably smaller than the aperture diameter. A typical circumstance is the use of an aperture of 100 microns in diameter to make a size study of a system whose particles primarily fall in the range of 3 to 8 microns in diameter.

The duration of the pulses which are produced by such particles passing through an aperture along a substantially axial trajectory will be the same, since for such relationship of particle size to aperture diameter, one may consider that the particle in all cases is a point moving through the sensing zone. It follows that all pulses will be practically the same at their lower and middle sections, with the amplitude being affected mostly at the center of the zone. If all particles act the same way such that their travel through the sensing zone will produce the same pulse widths or durations at their several bottom levels and even well up towards the top thereof, this fact can be used to make measurements on the basis of which the pulse is to be accepted or rejected. For example, if a known desirable pulse has a certain different duration at each of three different fractions of its amplitude, then each pulse which has those same respective durations for its three different fractional amplitudes measured at the same fraction as the desirable pulse will have the same shape as the desirable pulse and be also acceptable. Any variation from these three durations will be suspect. For example, if the bottom two are respectively the same as the bottom two of the desirable pulse, but the top one departs quite substantially therefrom, then obviously there is something unusual about the pulse which indicates that it is not advisable to consider its amplitude to be proportional to the size of the particle which produced the same. This suspected pulse should be disregarded, and that is what is accomplished by the invention herein.

Any pulses which pass through the sensing zone and whose lower fraction has a duration that is substantially a departure from normal is surely not produced by a particle passing on axial trajectory through the aperture, and this signal is to be disregarded in accordance with the teachings of the copending applications.

By disregarding a percentage of the particle pulses, fewer will be considered by the pulse height analyzer which follows the sensor apparatus, resulting in a slight degradation of the statistical accuracy if a given amount of sample is scanned. The data which are obtained, however, are of greater quality. Obviously, counts will be made before passing the particle signals to the sensor apparatus of the invention.

SUMMARY OF THE INVENTION

According to the invention herein, the particle pulses are examined by ascertaining their durations at two or more fractions of their respective amplitudes. The resulting duration-measuring signals are then converted into pulses the amplitudes of which are proportional to their respective durations as measured by the duration-measuring signals. These amplitudes are then compared with preestablished criteria to ascertain whether the original particle pulse was of a duration and shape to be passed to the pulse being analyzed or to be disregarded.

A number of criteria are established by means of a corresponding number of duration-measuring circuits which respond to the particle generated pulses in a manner to be described. Each of these circuits remembers a duration corresponding to a statistical value possessed by the previous particle pulses and does not pass any pulse whose duration at its fractional height does not fall within the specified limits as determined by this reference level. Thus, all of the circuits combine to provide a set of criteria which the particle pulse being examined must meet at all of the fractional heights in order to be considered. Structure is provided to disable the sensor during the processing of a pulse to prevent application of any following pulses while processing is occurring. Structure is also provided to disable the sensor unless the incoming signal has dropped below a predetermined threshold to prevent attempted processing of partial pulses.

A novel circuit for automatic adjustment of the various duration levels is provided.

DESCRIPTION OF THE PREFERRED EMBODIMENTS

Figure 1:
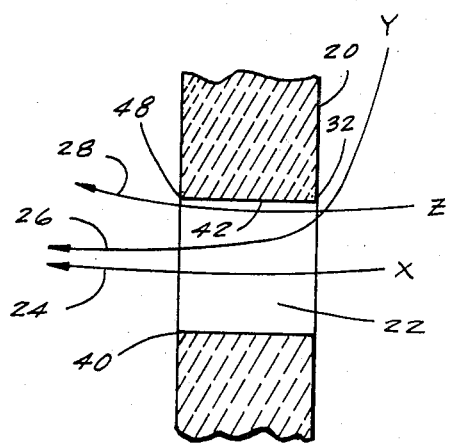
FIG. 1 is a diagrammatic view of the aperture of a Coulter particle analyzing apparatus showing the paths of different particles through the aperture.

This invention is based upon a practical consideration of the electric pulses which result when a suspension of particles is passed through the aperture of a Coulter electronic particle analyzing device. Since the physical length of the aperture is constant, and one would consider that the rate of flow remains constant, it should follow that all particle pulses, that is, the electrical signals produced in the detector of the Coulter apparatus, should have the same duration. Moreover, it should follow that all particle pulses should have the same durations at any and all of several fractional amplitudes. That this is not true has been known for some time. A pulse due to a particle passing through the aperture on an angle such as, for example, entering close to an edge of the entrance and/or passing close to a wall of the aperture will not have the same duration or shape as a pulse due to an identical particle entering on the axial center and passing through the center of the aperture. Additionally, the amplitude and/or the waveform of the signal may be considerably different from the signal produced by the on-center particle.

As explained in the copending applications, the principle basis of the invention therein and that which is disclosed in this application is to measure the pulse duration of the signals produced by the particles passing through the aperture and then to discriminate between these signals in some way, discarding the anomalous of them and using only those whose durations lie in a range which would indicate that the particles producing them had followed a more or less axial path through the aperture. The apparatus of the instant invention differs from the foregoing in that the durations of the pulses are measured at more than one fractional height amplitude and all of the duration measurements must lie in the acceptable range in order for the pulse to be passed to the pulse height analyzer which follows the sensor of the invention. A preferred embodiment of the apparatus of the present invention also differs from those of the other copending applications in that instead of using the minimum duration of the previous pulses as the criterion against which pulses are accepted or rejected, the acceptance level is taken as some percentile of the durations of the particle pulses such that not only long pulses due to particles far off axis are discarded, but all pulses which are considerably shorter than the majority are also discarded not only from the ultimate output of the device, but also from the circuits which establish the accept-reject criteria based upon measurements of past pulses. This provision ameliorates the problems associated with noise pulses which occasionally confuse a measurement in which the criterion was the shortest previous pulse.

The circuitry of the sensors of the invention herein and that of the copending applications embody the methods for selection or rejection on the basis of fractional pulse height duration measurements and utilize certain novel structure respectively for applying criteria for discarding and using others. Although detailed in the copending applications, it would also be of value here to explain the differences between the types of pulses which are produced by particles passing through the aperture of the Coulter electronic particle analyzing device.

Figure 7:
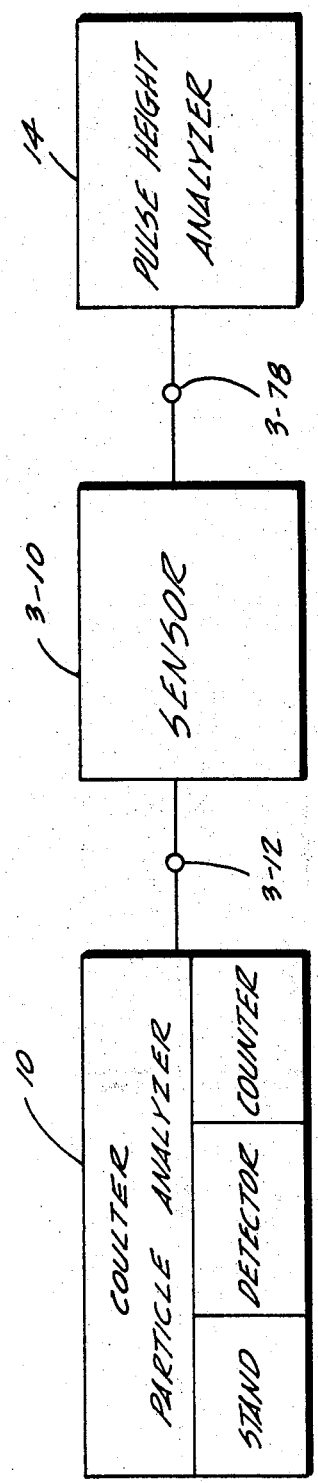
FIG. 7 is a block diagram of a system constructed in accordance with the invention and using an axial trajectory sensor.

A system constructed in accordance with the invention is illustrated in FIG. 7. The block 10 comprises a Coulter particle analyzing apparatus which is normally composed of a stand, detector and counter. The stand includes the vessels, aperture tube, fluid system and electrodes of the apparatus. The detector includes circuitry which produces the particle pulses. The counter may be any device which responds to the particle pulses, and may include pulse height discriminating means. It may be omitted in instances where only size studies are to be made, but is shown in order to point out that since the sensor 3–10 will be discarding many pulses, it is best to make any counts prior to applying the particle pulses to the sensor 3–10. As seen, from the sensor 3–10, the output signals at 3–78 are applied to some form of pulse height analyzer 14 in order to make the sizing studies.

FIG. 1 is a diagrammatic view of an aperture which is provided in a wafer set into the wall of an aperture tube, said tube constituting the scanning means in the stand of Coulter electronic particle device 10, immersed in a liquid and having particles passing through the aperture of the wafer. Thus, the wafer is designated 20, and the aperture itself is designated 22. The sample liquid is passing through the aperture 22 from right to left, and as it moves, it carries the particles in suspension with it. The paths of three particles, X, Y, and Z, are illustrated at 24, 26, and 28, respectively. These paths are deliberately chosen to be considerably different, for purposes of illustration, and the signal or particle pulses which are produced as a result of such passage are shown on the identical time base in FIG. 2 at graphs X, Y, and Z.

The particle X passes almost coaxially of the aperture 22 along the path 24. The speed of the liquid passing through the aperture at this point is maximum and the current density distribution along the path is most uniform. Accordingly, the resulting pulse 30 in FIG. 2, as shown in the curve X, is a simple bell-shaped pulse whose duration is proportional to the length of the aperture 22 from $t_1$ to $t_2$ and whose amplitude is quite closely proportional to the size of the particle. Although the amplitude will be considered as voltage, it should be understood that pulses and signals could also be current waves.

The particle Y passes through the aperture on a path which brings it close to the corner of the aperture at 32, where the current density is much higher than that closer to the axis of the aperture. It is not close enough to the wall of the aperture at 42, however, to experience much loss of velocity. Since the aperture is so short and it takes several aperture diameters to develop laminar flow, the flow profile in the aperture is almost uniform, that is, with the exception of the regions in intimate contact with the aperture walls, the flow velocity is almost constant across its diameter. Particles which pass closer to the aperture walls will suffer a loss of velocity, but in this case, we are concerned with a particle which comes close enough to the edge to come within the region of exalted current density, but not so close as to be slowed appreciably. Of course, the apparatus will reject pulses due to particles which come closer to the aperture walls than the path indicated as being followed by particle Y, but it is the pulses due to particles following intermediate paths which the present invention is especially effective in rejecting. Due to the fact that the path of particle Y passes through the region of exalted current density at the edge of the aperture, the beginning of the pulse 34 which is produced by this particle will have a higher amplitude and will also commence very slightly before the pulse 30. As shown, there is accordingly a peak at 36 due to the effect of the high current density at the corner 32.

The particle Z goes through the aperture 22 on a relatively straight line, but in this case it is quite close to the wall 42 of the aperture. The resulting pulse 42′ has two peaks, one at 44 caused by the corner 32 with its high current density and the other at 46 caused by the particle passing through the high current density at corner 48. In this case the particle will remain in the aperture longer than the time $t_1$ to $t_2$ because the speed of flowing liquid is less adjacent the wall than it is in the center of the stream. This is a well-known phenomenon of flow of liquids through orifices.

In these three cases it can be seen that the only pulse which is most truly representative of the size of the particle is that due to the particle which passes through the center of the aperture 22, namely, the particle X. According to the invention, circuitry is provided to discard pulses of the other types, based upon a multiplicity of fractional height durations, since it becomes clear that only the pulses having the same duration and shape as the pulses due to particles following an axial path are acceptable.

Figure 2:
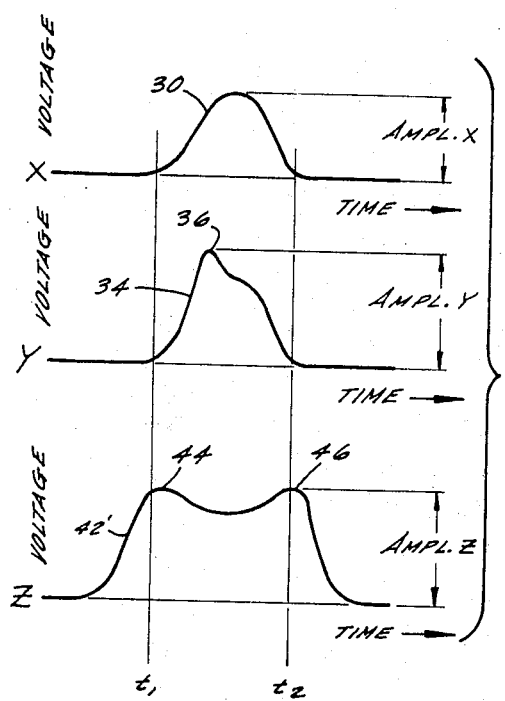
FIG. 2 is a diagram showing the graphs of particle pulses resulting from the passage of the particles of FIG. 1 along the paths shown through the aperture.

According to the invention, structure is provided to discriminate between the different types of pulses which are illustrated in the graphs of FIG. 2. The basis for discrimination in the apparatus which is described in connection with the several circuits detailed hereinafter is analog in nature, although as explained in the copending applications the basic concept which underlies both the invention herein and that of said copending applications can be applied to digitally operating apparatus as well.

Figure 3A:
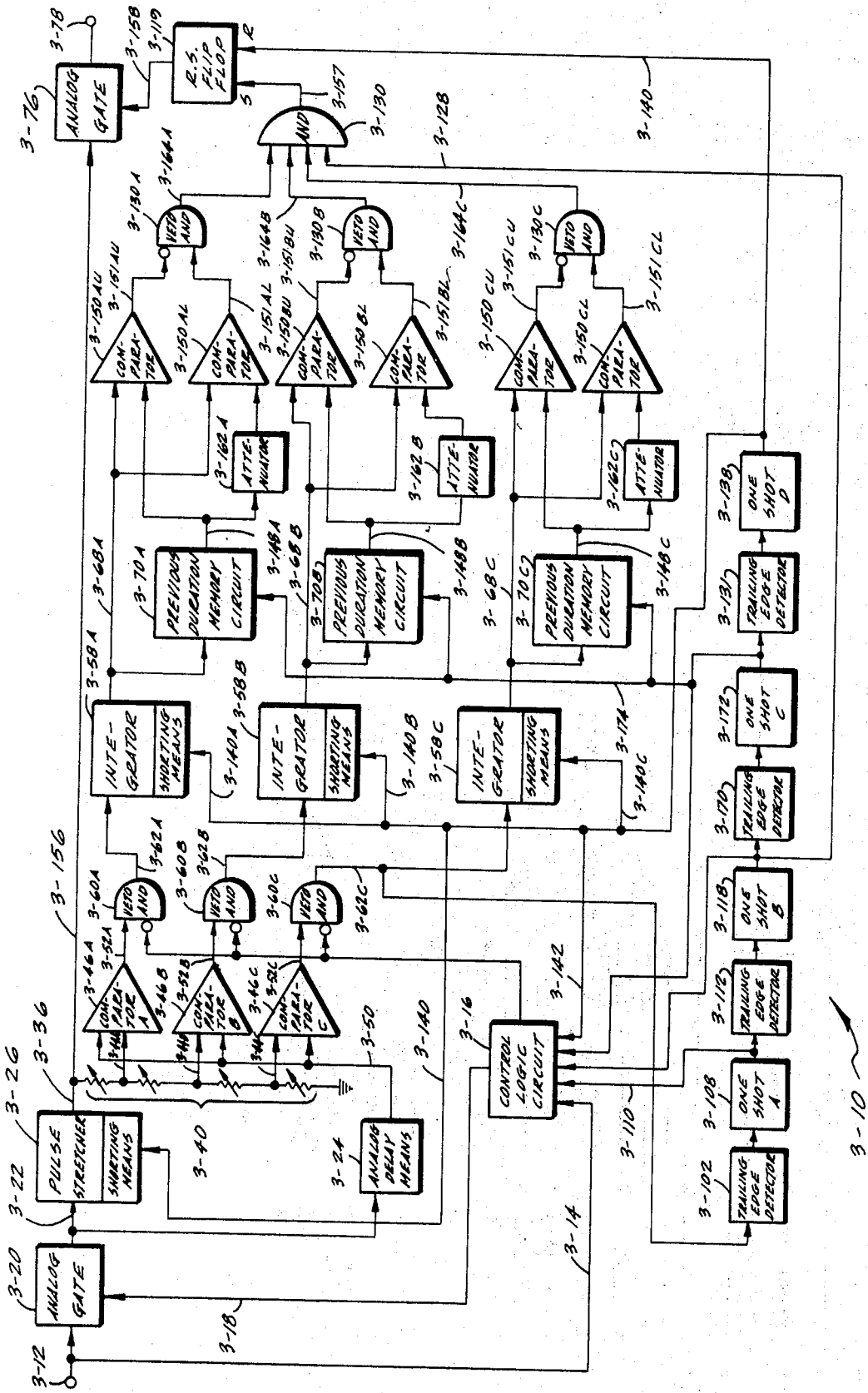
FIG. 3A is a block diagram of an axial trajectory sensor constructed in accordance with the invention.
Figure 3B:
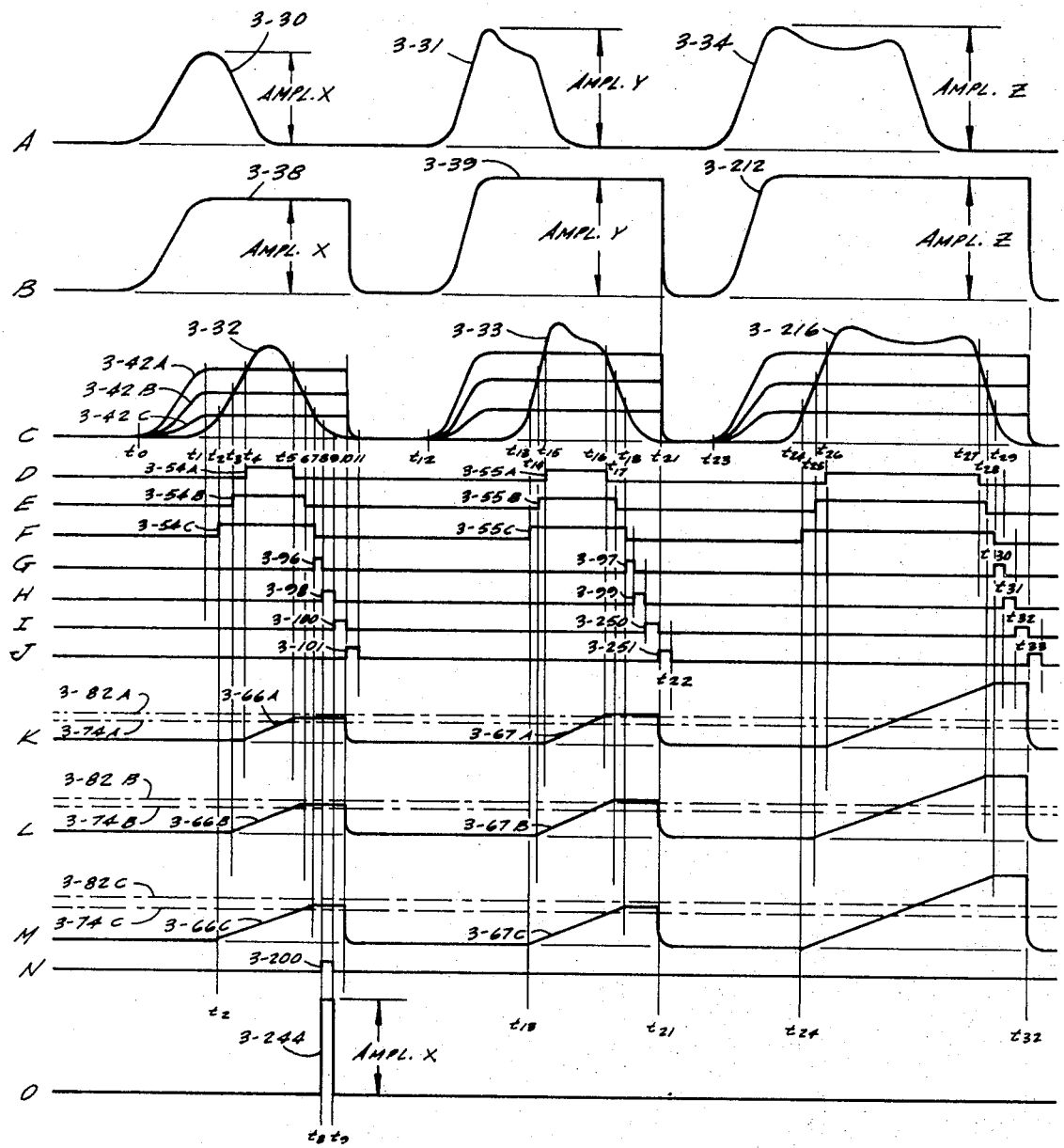
FIG. 3B is a diagram consisting of a series of graphs, all on the same time scale, illustrating various waveshapes throughout the sensor of FIG. 3A resulting from the processing of three particle pulses therein.

The block diagram of FIG. 3A illustrates an axial trajectory sensor which utilizes the basic concept and invention of the said copending applications and in addition is constructed in accordance with this invention to achieve the purposes alluded to above. For the purposes of the explanation, it is assumed that three particles are being examined, such as particles X, Y, and Z of FIGS. 1 and 2, and the resulting salient signal waveshapes derived from the pulses throughout the circuits are illustrated in FIG. 3B, all on the same time base.

Referring now to FIG. 3A, the sensor of the invention is designated generally by the reference character 3–10 and is characterized by the provision of means to discriminate between pulses of different durations at two or more fractional pulse amplitudes on the basis of which the desired pulses are chosen are permitted to pass through the apparatus 3–10 albeit in analog form. The discriminating means is automatically controlled by the pulses themselves and operates on the assumption that practically all of the desirable pulses will have the same durations at the chosen fractional amplitudes and that these durations will be within a set tolerance relative to a statistical value taken from similar measurements of the immediately preceding particle-generated pulses. All pulses having any fractional height duration which falls outside of the limits set into the apparatus will therefore be discarded, and all pulses which have all fractional height durations within the acceptable limits will be accepted and passed to the pulse height analyzing device which follows the sensor 3–10.

The same discriminating means are used in all of the different channels or paths of the sensor 3–10 which are followed by the separate fractional pulse height signals. In addition, means are provided for disabling the apparatus during the processing of a pulse, the details of which are disclosed in the copending applications and particularly in copending application Case II. The purpose of these means is to prevent partial pulses of very small duration from causing an undesirable long term reaction in the discriminating means. This would occur, for example, if the apparatus were receptive too soon after a particle pulse has been processed and a particle pulse immediately following is accepted after a part has already been held back. In an embodiment using a set of predetermined duration percentiles, which will be described in detail hereinafter, the incorporation of the latter means is less essential than in other forms of the invention. Simple threshold means may be used to prevent noise from affecting the discriminating means.

The output pulse of the sensor 3–10 in every case will have the identical amplitude as the original particle pulse from which it is derived, such as for example the pulse 30 of FIG. 2 but will have a predetermined duration governed by the electronic characteristics of the circuitry. Since size information is paramount, the duration of the output pulse is immaterial and according to the operation of the apparatus 3–10 all output pulses will have the same duration. This is also true of similar apparatus constructed in accordance with the teachings of the invention herein which might base acceptance or rejection of the particle pulses on other statistical measurements.

Referring now to FIGS. 3A and 3B, the input terminal 3–12 has applied to it a train of particle pulses which emanate from the apparatus 10 that is constructed in accordance with the principles of U.S. Pat. No. 2,656,508. As such, these pulses have been produced as a result of particles passing through an aperture such as 22 illustrated in FIG. 1 and are of different amplitudes for different size pulses. As known, the pulses will also be of different durations and different configurations. Ideally, the pulses produced by a Coulter electronic particle device using a conventional short aperture should all be bell-shaped and should differ from one another only as to their amplitude. Practically, this does not always occur. The invention herein and those of the copending applications are based upon the practical limitations of the usual Coulter device and seek to render the information on size obtainable therefrom more accurate and reliable.

The train of pulses which is received at the terminal 3–12 has been amplified prior to the application to the apparatus 3–10. This is accomplished by circuitry normally included in the detector of the usual Coulter electronic particle counting and sizing apparatus or even afterward. In FIG. 7, as previously explained, there is illustrated a block diagram of the system into which the invention herein is connected. The amplifier to achieve the amplification above-mentioned may be included in the counter and/or detector portion of the analyzer 10 or may be an added circuit in the line to the terminal 3–12. As seen, from the sensor 3–10, the output signals at 3–78 are applied to some form of pulse height analyzer 14 in order to make the sizing studies.

The signals appearing at the input terminal 3–12 are the particle pulses illustrated in FIG. 2. The three pulses 3–30, 3–31 and 3–34 shown in graph A of FIG. 3B represent the desirable and undesirable pulses. It is desired to accept the first and reject the second and third with the output at 3–78 being an analog of the first pulse 3–30 and there being no pulses corresponding to the input pulses 3–31 and 3–34. The first particle pulse 3–30 comprises a pulse produced by a particle which traversed the aperture 22 approximately along an axial trajectory, while the pulses 3–31 and 3–34 might have been caused by particles which went through the aperture off center.

Considering first the pulse 3–30, it has an amplitude X and, assuming it has passed through the analog gate 3–20, it appears on the line 3–22 and is applied simultaneously to the pulse stretcher 3–26 and the analog signal delay means 3–24. The capacitor of the pulse stretcher 3–26 follows the leading edge of the pulse 3–30, charging up to the amplitude X and holding this charge after the pulse 3–30 subsides. The result is the flat-topped pulse 3–38 of graph B of FIG. 3B having the amplitude X and a duration controlled by other elements of the circuit. This latter pulse 3–38 appears at the line 3–36 to be applied to the attenuator 3–40 and to the line 3–156 which extends to the output analog gate 3–76, this latter gate being closed (non-conducting) at the time the pulse 3–38 commences. The attenuator 3–40 attenuates the pulse 3–38 to several fractional values of the amplitude X and the resulting fractional amplitude pulses 3–42A, 3–42B and 3–42C of graph C of FIG. 3B appear at the input lines 3–44A, 3–44B and 3–44C of the comparators 3–46A, 3–46B and 3–46C, respectively. The attenuator 3–40 is shown as a string of series connected resistors between the line 3–156 and ground, although any equivalent form of attenuator or attenuators may be used. In the meantime, the pulse 3—30 has been delayed by the analog signal delay means 3–24 and appears as the pulse 3–32 on the line 3–50, comprising the second input to each of the comparators 3–46A, 3–46B and 3–46C. The fractional amplitudes for the pulses 3–42A, 3–42B and 3–42C are chosen so that a sharp comparison can be made with pulse 3–32 in each case. Conveniently, these fractions can be 75 percent, 50 percent and 25 percent, respectively, of the pulse 3–38, but other sets of fractions may be used.

The delayed pulse 3–32 and the fractional pulses 3–42A, 3–42B and 3–42C are shown superimposed in graph C of FIG. 3B. Where the pulse 3–32 exceeds its own several fractional heights measured by the attenuated pulses 3–42A, 3–42B and 3–42C, namely — in the intervals $t_4$–$t_5$, $t_3$–$t_6$ and $t_2$–$t_7$ the comparators 3–46A, 3–46B and 3–46C emit the pulses 3–54A, 3–54B and 3–54C on the respective paths 3–52A, 3–52B and 3–52C. These are shown in graphs D, E, and F of FIG. 3B, respectively. Assuming for the moment that the control logic circuit 3–16 is permitting passage of these pulses by not applying signals to the VETO AND circuit gates 3–60A, 3–60B and 3–60C, these pulses also appear at 3–62A, 3–62B and 3–62C respectively.

The pulses 3–54A, 3–54B and 3–54C are integrated by the integrators 3–58A, 3–58B and 3–58C, respectively, producing the pulses 3–66A, 3–66B and 3–66C on the respective paths 3–68A, 3–68B and 3–68C. These latter three pulses are shown in graphs K, L, and M of FIG. 3B, respectively. The integral pulse in each case consists of a ramp and plateau, the height of the plateaus being a measure of the duration of the rectangular pulse which was integrated. In each case, the plateau is reached during the time that the rectangular pulse was being integrated, and this plateau is held until the capacitors of the integrators are shorted. Since each of the rectangular pulses 3–54A, 3–54B and 3–54C had different durations, the integrated pulses 3–66A, 3–66B and 3–66C will have different amplitudes, the amplitude in each case being proportional to the duration of the rectangular pulse of which it is an integral.

These integral pulses on the lines 3–68A, 3–68B and 3–68C are applied to the comparators 3–150AU, 3–150BU and 3–150CU as well as to the respective companion comparators 3–150AL, 3–150BL and 3–150CL. The pulses are compared in each case with the output of a memory circuit whose output in each case is divided into two parts, one of which passes through an attenuator. Thus, the memory circuit 3–70A has an output which appears on the line 3–148A, being applied directly to the lower terminal of the comparator 3–150AU and being applied through the attenuator 3–162A to the lower terminal of the comparator 3–150AL; the memory circuit 3–70B has an output which appears on the line 3–148B, being applied directly to the lower terminal of the comparator 3–150BU and being applied through the attenuator 3–162B to the lower terminal of the comparator 150BL; and the memory circuit 3–70C has an output which appears on the line 148C, being applied directly to the lower terminal of the comparator 3–150CU and being applied through the attenuator 3–162C to the lower terminal of the comparator 3–150CL. The attenuated outputs of the memory circuits which are applied to the lower comparators 3–150AL, 3–150BL and 3–150CL are shown as the respective dot-dash lines 3–74A, 3–74B and 3–74C on graphs K, L and M respectively of FIG. 3B. The unattenuated outputs of the memory circuits 3–70A, 3–70B and 3–70C which are applied to the lower input terminals of the respective comparators 3–150AU, 3–150BU and 3–150CU comprise the dash-dot lines 3–82A, 3–82B and 3–82C of graphs K, L, and M of FIG. 3B.

The six comparators are connected in such a configuration that in each case if the voltage at the upper input terminal exceeds that of the lower input terminal, the output of the comparator will exhibit a logical "one," that is a signal will appear at such output. In the event that the voltage on the lower input terminal of each exceeds that of the upper input terminal, then there will be a logical "zero" or no signal at the output of that comparator.

According to the invention, it is desired that the levels represented by each set of dot-dash lines set the tolerance within which the plateau of the associated plateau and ramp signal will lie to comprise an acceptable signal. Consider for example the middle one of the several pulses and signals. The output of the comparator 3–46B is a duration-measuring pulse 3–54B and when it is integrated in the integrator 3–58B it produces a time signal pulse 3–66B whose amplitude is proportional to the duration of the duration-measuring pulse 3–54B. The upper level established for a desirable time signal pulse in this part of the circuit is the level 3–82B and the lower level established for a desirable time signal pulse in this part of the circuit is the level 3–74B. If the plateau, that is the maximum amplitude, of the time signal pulse 3–66B falls between the two established levels, it is desired that the analog gate 3–76 at the output of the sensor 3–10 be opened so that there will be an eventual output pulse, at least insofar as the middle fractional amplitude of the original particle pulse is concerned. In order for an output to occur, this condition will also have to obtain with the respect to the upper and lower signals also, but for the moment, only the middle signal is being discussed.

The desired output from the two comparators 3–150BU and 3–150BL is a logical "one" to appear at the line 3–164B (with the other logical "ones" from the upper and lower fractional amplitude signals) to produce an output from the AND gate 3–130 and thereby produce the desired signal to the output. This is accomplished by means of the middle VETO AND gate 3–130B whose inputs are 3–151BU and 3–151BL from the respective comparators 3–150BU and 3–150BL. If there is a logical "one" on the lower input line 3–151BL this means that the plateau of the time signal pulse 3–66B exceeds the level 3–74B. If there is a logical "zero" on the upper input line 3–151BU this means that the plateau of the time signal pulse 3–66B is below the level 3–82B. Under these circumstances, the plateau of signal 3–lies between the desirable limits and is acceptable. Under these conditions, there is a logical "one" at the output 3–164B of the VETO AND gate 3–130B. The same effect could be had by reversing the two inputs to the comparator 3–150BU in which case a straight AND gate could be used instead of the VETO AND gate 3–130B.

It follows from the above discussion with respect to the middle one of the paths handling the middle fractional amplitude signals that the same functions are performed for the upper and lower fractional amplitude signals. If the plateau of time signal pulse 3–66A lies between the levels 3–82A and 3–74A there will be a logical "one" on the line 3–164A as the output of the VETO AND gate 3–130A and further, if the plateau of the time signal pulse 3–66C lies between the levels 3–82C and 3–74C there will be a logical "one" on the line 3–164C as the output of the VETO AND gate 3–130C.

The above explanation indicates that in order for each of the three inputs 3–164A, 3–164B and 3–164C to the AND gate 3–130 to carry a logical "one" signal the conditions of desirability in all three parts of the sensor 3–10 must be satisfied. At each fractional amplitude of the original particle pulse 3–30 the duration must fall within the limits established by the three memory circuits 3–70A, 3–70B and 3–70C, respectively. Failing any one of these requirements, that particular input line to the AND gate 3–130 will carry a logical "zero" and there can be no output signal from the AND gate 3–130 irrespective of what appears on the line 3–128. The significance of a pulse meeting all requirements is that it conforms at all of its fractional amplitudes in duration to the majority of preceding pulses and hence has substantially the same shape and must have been produced by a particle passing through the aperture on an axial trajectory. Failing to meet the requirements means that the pulse at one or more levels had a departure from the duration of the majority of preceding pulses at that level and hence was not of the same shape or duration. In the latter case, as explained, there will be no output signal from the AND gate 3–130 because the pulse from the strobing one-shot 3–118 appearing on the line 3–128 will be blocked. The operation of this latter component of the sensor 3–10 will be described hereinafter.

Reverting now to the output of the VETO AND gate 3–60C which occurs on the line 3–62C, it will be seen that the duration-measuring pulse 3–54C terminates at the time $t_7$. The trailing edge of this pulse is detected by the trailing edge detector 3–102 and the resulting trigger spike is used to trigger the one-shot 3–108. The latter produces a pulse 3–96 which is shown in graph G of FIG. 3B appearing on the 3–110. The trailing edge of the pulse 3–96 at the time $t_8$ is detected by the trailing edge detector 3–112 and provides a trigger spike which triggers the one-shot 3–118, the latter producing a pulse 3–98 shown in graph H of FIG. 3B. This pulse 3–98 is the strobing pulse previously referred to, being connected by way of the line 3–128 to the AND gate 3–130 and providing the fourth input to the gate. Under these conditions, since there is a logical "one" signal on all inputs to the AND gate 3–130 there will be an output from the AND gate 3–130 on the line 3–157. This is the pulse 3–200 shown in graph N of FIG. B occurring between the times $t_8$ and $t_9$. The pulse 3–200 sets the RS flip-flop 3–119 which in turn impresses a logical "one" on the connection 3–158 and turns on the analog gate 3–76. The stored pulse amplitude from the pulse stretcher 3–26 appearing on the line 3–156 is applied to the output terminal 3–78 producing the reconstructed pulse 3–244 having the amplitude X of the original particle pulse 3–30 for application to the pulse height analysis apparatus 14 (FIG. 7).

The RS flip-flop 3–119 having been set by the pulse 3–98 of graph H of FIG. 3B from the output of the one-shot 3–118, it is required that it be reset for the processing of the next particle pulse. The trailing edge of the pulse 3–98 which occurs at the time $t_9$ is detected in the trailing edge detector 3–170 producing a triggering spike that in turn triggers the one-shot 3–172. The primary purpose of this one-shot is to provide a strobing pulse 4–112 (graph I) to the past history duration memory circuits 3–70A, 3–70B and 3–70C in order to update the information that is contained in each of these memory circuits. Note that the accept or reject pulse on the connection 3–158 to the analog gate 3–76 having once been made should not be subject to change if the voltage from the memory circuits causes one or more of the acceptance levels 3–82A, 3–82B, 3–82C, 3–74A, 3–74B or 3–74C to change after once having made a decision. The addition of the RS flip-flop 3–119 prevents this change of decision in the middle of processing a pulse. Instead, the outputs from the memory circuits 3–70A, 3–70B and 3–70C are updated, but the output of the RS flip-flop is unaffected once the decision has been made.

At the termination of the memory update pulse 3–100 which occurs from between the times $t_9$ and $t_{10}$ as shown in graph I of FIG. 3B, the trailing edge detector 3–131 triggers the one-shot 3–138 which emits the pulse 3–101 of graph J of FIG. 3B between the times $t_{10}$ and $t_{11}$. This pulse resets all of the integrators, the RS flip-flop 3–119 and the pulse stretcher 3–26 in preparation for the next particle pulse. This pulse which is to be described hereinafter is the puse 3–31 of graph A of FIG. 3B. The analog gate 3–20 is now turned on again in the manner described in one of the copending applications above-identified. The operation of the control logic circuit 3–16 is also described in detail in said copending application.

The pulse 3–31 of graph A of FIG. 3B is chosen for the purposes of explaining the operation of the sensor 3–10 to have a quarter height duration exactly the same as that of the pulse 3–30. In other words, the duration-measuring pulse 3–55C is exactly the same as the duration-measuring pulse 3–54C because the bottoms of each of the pulses 3–30 and 3–31 are the same. The pulse 3–31, however, is produced by a particle Y moving on the path 26 of FIG. 1 which grazed the leading edge 32 of the aperture 22 on its way into the entrance and therefore the pulse has overshoot on its leading edge giving rise to the erroneously large amplitude Y. Since the amplitude Y is erroneous, and it has been assumed that all of the pulses of graph A of FIG. 3B were produced by the same size particles, it is desired to reject this particle pulse. In the case of certain of the circuitry of the copending application where the measurement of duration is made at only one fractional amplitude, if the duration of this pulse at the chosen fraction was within the limits set, which it could very well be, the pulse would be accepted even though it has the false peak. It would degrade the quality of the information obtained from the sensor. In the sensor 3–10 of the invention, as will be seen, this type of pulse is rejected because there is a plurality of fractional levels at which duration is measured, and all levels must meet the criteria set for them before the pulse is accepted.

The same sequence of events takes place as described in connection with the processing of the pulse 3–30. The duration-measuring pulses 3–55A, 3–55B and 3–55C are produced at the outputs of the respective comparators 3–46A, 3–46B and 3–46C. These pulses are assumed to pass through the VETO AND gates 3–60A, 3–60B and 3–60C and are applied to the integrators 3–58A, 3–58B and 3–58C producing the time signal pulses 3–67A, 3–67B and 3–67C shown in graphs K, L, and M, respectively of FIG. 3B. Since the assumption was made that the pulse 3–31 has the same quarter height duration as the pulse 3–30, the pulse 3–67C lies between the limits 3–74C and 3–82C so that there is a logical "one" on the path 3–164C that comprises one of the inputs to the AND gate 3–130. As for the half and three-quarter height durations, the resulting time signal pulses 3–67B and 3–67A both exceed the respective upper limits 3–82B and 3–82A. Accordingly, when the strobing pulse 3–99 occurs, it will not be able to get through the AND gate 3–130, the RS flip-flop will not be set, the analog gate 3–76 will not open, and there will be no pulse at 3–78 which corresponds to the original particle pulse 3–31. There will be pulses 3–250 and 3–251 corresponding to the pulses 3–100 and 3–101 but their presence will have no effect upon the production of a signal at 3–78. There will be no pulse equivalent to the pulse 3–200.

In the case of the particle pulse 3–34 of graph A of FIG. 3B, it can be seen that the durations at all fractional height exceed the acceptable limits. On this account, none of the upper three inputs 3–164A, 3–164B and 3–164C will have logical "ones" impressed upon them, and again the strobing pulse from the one-shot 3–118 will not get through to set the RS flip-flop 3–119 and the pulse 3–34 will also be ignored.

It should be considered in review that the pulse 3–30 had to be of the proper duration and shape in order to pass through the sensor 3–10. The pulse 3–31 had the proper duration, considering its base, but not the proper shape. The pulse 3–34 had neither the proper duration nor the proper shape.

The circuits 3–70A, 3–70B and 3–70C which are called previous duration memory circuits may be provided as duplicates in case the sensor circuit is constructed to consider only the durations at two levels or even provided as quadruplicates in case four levels are to be examined. Preferably this circuit, which is identical for all levels, is one which produces a quasi-d.c. voltage representing some percentile of fractional pulse height durations. In other words, its voltage corresponds to that duration below which some fraction of the durations fall and above which the rest of the durations fall. It has been found practical and with excellent results to use the 25th percentile, that is, the duration which is longer than 25 percent of the durations measured but shorter than the other 75 percent of the durations measured. The principle of generating a voltage proportional to such a dividing duration percentile is quite similar to that disclosed in U.S. Pat. No. 3,557,352 owned by the assignee of this application.

Figure 4:
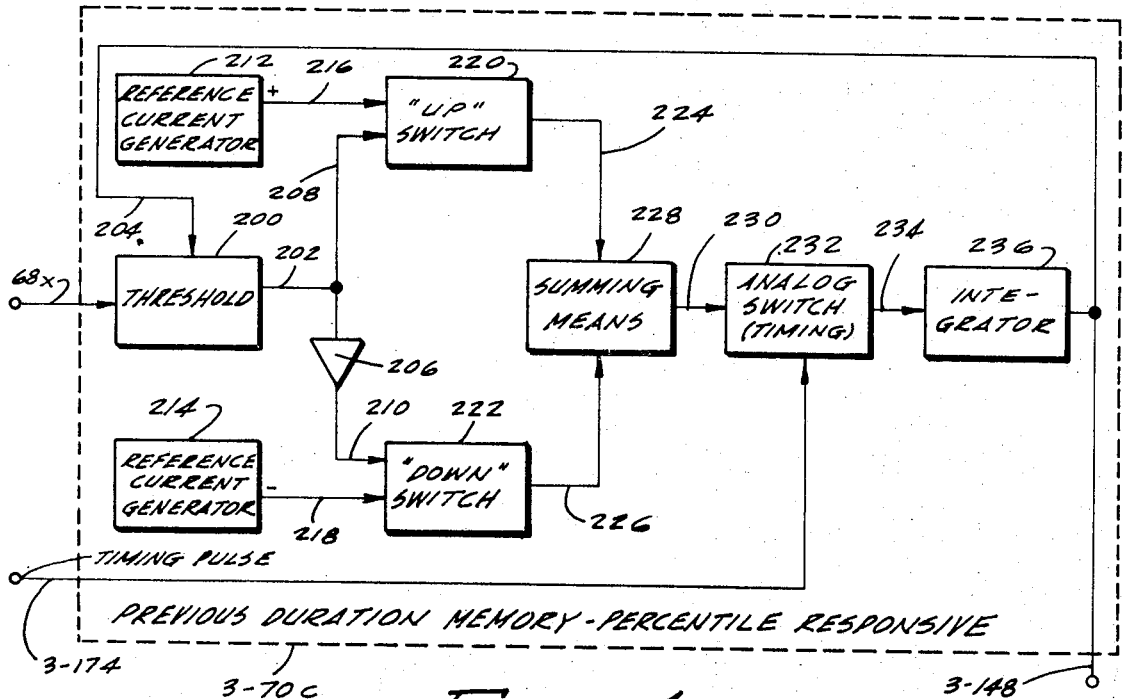
FIG. 4 is a simplified block diagram of the previous duration memory circuit of FIG. 3A which is responsive to a predetermined percentile of particle durations previously measured.

FIG. 4 is a block diagram of a previous duration memory circuit such as used as the blocks 3–70A, 3–70B and 3–70C of FIG. 3A showing the simplest form of the circuit. Pulses whose amplitudes convey the duration information to be processed in the form of time signal pulses like the ramp and plateau pulses of FIG. 3B are applied at the terminal 68X. This terminal corresponds to any one of the lines 3–68A, 3–68B or 3–68C of FIG. 3A. These pulses pass through the threshold circuit 200 to have an output at the line 202, depending upon whether or not the pulse at 68X is smaller than or greater than the voltage at the path 204. The phase inverter 206 may or may not be necessary depending upon whether the threshold circuit 200 has one or two oppositely phased outputs. It is included here to emphasize the fact that the logic signals at paths 208 and 210 are complementary. If there is a signal at 208 there will not be one at 210 and vice versa. The two reference current generators 212 and 214 generate currents which are routed by way of the paths 216 and 218 to the electronic analog switches 220 and 222, depending upon the state of the logic commands at 208 and 210. A current, as determined by the current generator 212 or 214 flows in the paths 224 or 226, depending upon which of the switches 220 or 222 is on. These currents combine in the summing means 228 and therefore provide at the path 230 a positive or negative current, depending upon the state of the up and down switches 222 and 220 which in turn are controlled by the threshold circuit 200.

Once a voltage is applied at the input terminal 68X, a decision is made as to whether a current will flow in the up switch or the down switch, after which time it is possible to turn on a timing pulse by way of the other input path 3–174 (which is equivalent to that of the same reference numeral in FIG. 3A). A pulse on this second input turns on the analog switch 232 for a prescribed length of time and causes the current from either current generator 212 or 214 to flow by way of the path 234 into the integrator 236. As described in the above U.S. Pat. No. 3,557,352, the output of the integrator 236 runs up or down until such output which is fed back to the threshold circuit 200 by way of the path 204 finds the level at which the average current which drives it up is equal to the average current which drives it down. If these two currents are equal, this point of equilibrium will be the voltage analog of the median fractional height duration, that is to say, there will be as many pulses larger than the voltage at 204 than there are smaller than this voltage. Correspondingly, there will be as many fractional height durations longer as there are shorter than the median duration.

If one of the current outputs from the two current generators 212 and 214 is larger than the other, the equilibrium will be at some other percentile than the 50th or median. In the apparatus 3–10 of FIG. 3A it is found efficacious to have this equilibrium occur at the 25th percentile of particle durations, that is, at a point where it is found that 25 percent of the durations are smaller than the limit and the other 75 percent are longer.

Figure 5:
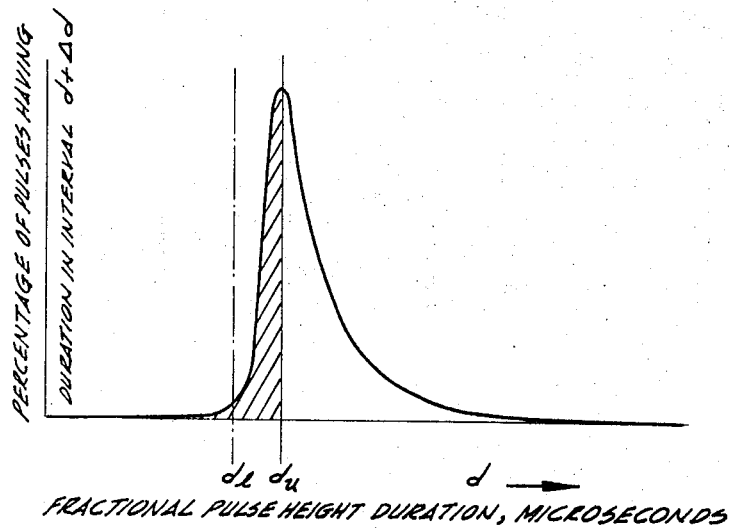
FIG. 5 is a graph showing the frequency distribution of pulses having the duration given by the value of the horizontal axis.

In order to understand this more completely, it might be useful to refer to FIG. 5, which is a differential duration distribution, or graph of percentage of pulses having durations in the interval $d + \Delta d$, where $d$ is a fractional height pulse duration, versus fractional pulse height duration in microseconds. There will be a characteristic duration distribution for each of the fractional height measurements incorporated into the apparatus. On this graph, it may be seen that the most frequent pulse duration is $d_u$, and it can be seen that if longer pulses are considered they become much less frequent. Also, pulses having a shorter duration than $d_u$ are very infrequent. It can be seen that the slope of the curve is very steep on the left side, because the only way in which a pulse can be shorter than the pulse produced by a particle traversing the aperture on an axial trajectory is either for a noise spike to add to the peak of a particle pulse and subtract from its leading and trailing edges, or for the pulse to be simply a noise spike alone. On the other hand, there are quite a few longer pulses and it can be seen from the graph that the longer the pulse considered, the less probable its occurrence.

The vertical line $d = d_u$ is intended to portray that point below which 25 percent of the durations will lie, and above which 75 percent of the durations will lie. This means that the area under the curve to the left of $d_u$, which is shown shaded, should be one-third of the area under the curve to the right of $d_u$. The dash-dot line labeled $d_1$, or the lower duration acceptable, corresponds to the dot-dash line of 3–74A, 3–74B, or 3–74C, of FIG. 3B on graphs K. L, or M. Durations which are shorter than $d_1$ are almost certainly noise pulses, and probably man-made noise pulses, and therefore it is desired that the circuit not respond to these. The advantage of using a percentile of these durations rather than the minimum duration as used in some of the copending applications is that these noise pulses are so infrequent that they do not affect the output of the percentile-sensitive memory circuit, whereas they would drag down the output of the minimum-duration memory circuit whenever they did occur and it would take time to recover from these undesired responses.

Under very quiet conditions, however, it would still be useful to have an axial pulse sensing circuit such as that of FIG. 3A, but wherein the previous duration memory circuit is a minimum duration memory circuit. It would also be possible to construct comparable apparatus in which the previous duration memory circuit comprised an average duration or modal duration memory circuit. An average or mean duration memory circuit could be constructed according to the principles employed in U.S. Pat. No. 3,473,010, assigned to the same assignee, wherein the processed pulses were the ramp-and-plateau pulses appearing at paths 3–68A, 3–68B, and 3–68C.

Figure 6:
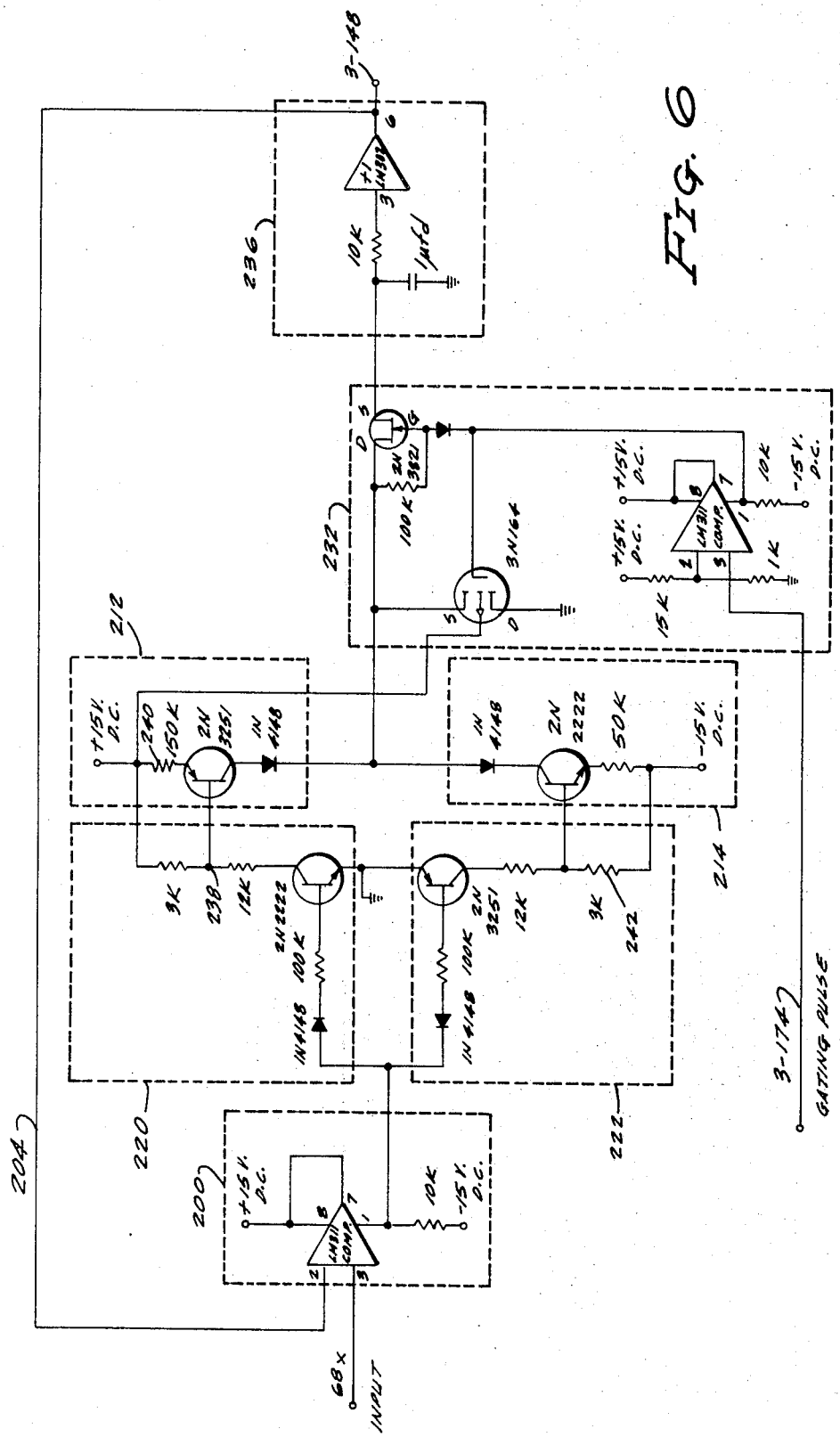
FIG. 6 is a detailed circuit diagram which performs the functions generally described by the apparatus of the block diagram of FIG. 4.

An actual circuit diagram of a 25th percentile previous duration memory circuit is illustrated in FIG. 6. In this figure, groups of components are enclosed by dotted lines and are given numbers which correspond to the homologous blocks in the block diagram of FIG. 4.

In block 200, an LM311 operational amplifier connected as a comparator is used as a threshold circuit; the 10K resistor is an external load on this operational amplifier. Other than that, the circuit is self-contained. The output at 202 will swing from very nearly the positive supply voltage of +15 volts to the negative supply voltage of −15 volts, depending upon whether the voltage at pin 2 exceeds that at pin 3 or vice versa.

In this physical embodiment, the up and down switches actually preceed the current generators and turn them on and off depending upon the logical output state from the threshold circuit 200, as determined by the voltage on the path 202. In this circuit, if the output swings to +15 volts, the upper switch will be turned on, that is the NPN transistor 2N2222 will conduct. The base current will flow through the 100K resistor and the 1N4148 diode. The lower 1N4148 will be back-biased, thus protecting the lower transistor 2N3251. When the upper transistor 2N2222 conducts, its collector will come very close to ground potential and thus the voltage at the junction 238 of the 3K and the 12K resistors will be three volts down from +15, or at 12 volts. This will mean that approximately three volts drop will appear across the 150K emitter resistor 240 of the 2N3251 which is the reference current generator 212. Under these conditions, the lower down-switch 222 will be cut off; therefore, there will be no drop in the 3K resistor 242 at the base of the lower transistor 2N2222 and therefore no current will flow in this resistor or transistor. Only the current from the upper current supply will flow into the integrator 236, and that will flow only during the time that the analog switch 232 comprising the MOSFET 3N164 and the FET 2N3821 are in the proper state.

The "down" switch is perfectly symmetrical, except, as may be seen, the transistors are of reversed polarity, that is, the switch transistor 2N3251 is now a PNP, and the current generating transistor 2N2222 is a NPN. This reversal of transistor polarities makes unnecessary the phase inverter 206 of the block diagram of FIG. 4.

The analog switch which causes this reference current to flow for the proper amount of time, as determined by the gating pulse appearing on the path 374 and controlled by the one-shot 3–172 of FIG. 3A comprises principally the FET 2N3821 and the MOSFET 3N '.64. These are P-channel and N-channel, respectively, and make it possible for the same polarity control pulse to turn one on and the other one off, simultaneously. When it is desired for the analog switch to be off, the FET 2N3821 is held nonconducting and the MOSFET 3N164 is held conducting in order to provide a path for the reference currents to flow to ground. When a gating pulse appears on 3–174, its level is shifted as required by the FETs and is applied to them, causing the 3N164 to cease to conduct, and the 2N3821 to conduct, thus causing the reference current to flow into the integrator 236, which in this case is a passive integrator. The level shifting network comprising the LM311 comparator and the three resistors at the bottom of the figure is a detail which is peculiar to the present circuit, and may or may not be necessary depending on the DC levels of the various signals and their amplitudes.

The use of the duration memory circuits described in considerable detail makes the establishment of the criteria of acceptance or rejection of the time signal pulses for the fractional amplitudes of each particle pulse automatic. Other forms of setting these limits both automatically and manually are described in the copending applications. For instance, instead of having the circuits 3–70A, 3–70B and 3–70C one might provide for three separate reference voltages and manually adjustable voltage dividers in order to furnish manually adjusted levels as the lower inputs to the comparators 3–150AU, 3–150AL, etc.

Additionally, for an economical form of device, one might use only one voltage level, say the levels 3–82A, 3–82B and 3–82C upon the assumption that it is unusual for a pulse of less than the most desirable duration to appear. Noise and transient pulses may be taken care of by suitable means. In such case, the components eliminated would be the attenuators 3–162A, 3–162B and 3–162C, the lower comparators 3–150AL, 3–150BL and 3–150CL, the VETO AND gates 3–130A, 3–130B and 3–130C and the connections involved. The input terminals of the upper comparators 3–150AU, 3–150BU and 3–150CU would be inverted and their outputs go directly to the AND gate 3–130. In all other respects, the apparatus will operate like the sensor 3–10.

It will be appreciated that considerable variation is capable of being made in the details of the invention without departing from the spirit or scope of the invention as defined in the appended claims. It will also follow from the description of the invention and the explanation of its functions and operation that the methods of practicing the same should be understood from the specification herein, and likewise such methods may be varied within the purview of the invention and without departing from its compass.

What it is desired to secure by Letters Patent of the United States is:

1. A particle study apparatus including the combination of an axial trajectory sensor and a particle analyzing apparatus; said particle analyzing apparatus having a detecting zone through which the particles are caused to pass for producing pulses, and said detecting zone having an axis; the particles, when passing closest to an axial trajectory through the detecting zone, producing desirable particle pulses having amplitudes which are most nearly proportional to the respective sizes of the particles, and also having a certain approximate duration and shape, and the particles when passing through the detecting zone on trajectories displaced from its axis producing other particle pulses having amplitudes which are not necessarily proportional to their respective sizes and having durations and shapes which tend to depart from said certain approximate duration and shape; said axial trajectory sensor being constructed with an input and an output and arranged to respond to said desirable particle pulses in a first manner and to respond to said other particle pulses in a second manner and further comprising: means for measuring the duration of at least a segment of a particle pulse applied to said input at a plurality of different predetermined fractions of the amplitude thereof and deriving a plurality of duration-measuring pulses having the measured durations of the pulse segments at the respective fractions; means for establishing a standard for a desired band of duration values for each of said measured fractional durations; means for comparing each said standard with its related measured fractional duration and for generating a first type of energizing signal if all of the measured fractional durations do not exceed their said standards and a second type of energizing signal if any of the measured fractional durations exceeds its standard; and output means coupled to receive said first and second types of energizing signals for generating, respectively, the first and second manners of response.

2. A particle study apparatus according to claim 1 which includes means providing a pair of fluid bodies, an aperture between the bodies with the bodies being insulated from one another electrically except through said aperture, one of said fluid bodies comprising a suspension of particles, means establishing an electric field in the aperture, means for flowing the sample suspension in the aperture to produce impedance changes in the aperture caused by the passage of particles, said aperture thereby defining said detection zone, means for detecting the impedance changes and producing said desirable and said other pulses, and means for coupling said detecting means to said sensor input.

3. A particle study apparatus according to claim 1 which includes means for converting each of said duration-measuring pulses into an electrical time signal pulse the amplitude of which represents the fractional duration, means for establishing an electrical effect for each fraction in the form of a pair of voltage levels, and the band of duration values established by said standard establishing means comprise the voltages between the levels individual to each fraction, and in which said comparing means compares the time signal pulse of each fraction with the pair of voltage levels corresponding to that fraction.

4. A particle study apparatus according to claim 1 in which said standard establishing means includes at least one memory circuit connected to receive the measured fractional durations for producing at least one corresponding output voltage level which is employed for establishing said standards.

5. A particle study apparatus according to claim 4 in which there is a different one of said memory circuits for receiving each of said different measured fractional durations, and each said memory circuit is constructed to produce its output voltage level proportional to a predetermined percentile of the measured fractional durations it previously received.

6. A particle study apparatus according to claim 5 in which said memory circuits are constructed and arranged so that the predetermined percentile is approximately 25 percent.

7. A particle study apparatus comprising the combination of an axial trajectory sensor and a Coulter type of particle analyzing apparatus in which particles passing through an aperture produce desirable particle pulses whose amplitudes are most nearly proportional to their respective sizes when passing closest to an axial trajectory through the aperture and having thereby a certain approximate duration and shape and in which particles passing through said aperture on trajectories displaced from the axis will produce other particle pulses whose amplitudes are not necessarily proportional to their respective sizes and whose durations and shapes tend to depart from said certain approximate duration and/or shape; said sensor acting to respond to desirable particle pulses and not to respond to said other particle pulses and comprising: input terminal means and output terminal means having a channel for passage of electrical signals between the terminal means with switch means in said channel to control the signals which appear at the output terminal means, the input terminal means adapted to have said desirable and other particle pulses applied thereto, means for measuring the duration of a particle pulse applied to said input terminal means at a plurality of different predetermined fractions of the amplitude of said full particle pulse and deriving a plurality of duration-measuring pulses of constant amplitude and each having the measured duration at the respective fraction, means for converting each of said duration-measuring pulses into a respective time signal pulse whose amplitude is proportional to the duration of the duration-measuring pulse from which it has been converted whereby to derive a plurality of time signal pulses of different amplitudes corresponding in number to the number of fractions, means establishing for each fraction a voltage level corresponding to the maximum amplitude for a time signal pulse representing maximum duration for a desirable pulse measured at the particular fraction, all time signal pulses of amplitude greater than said voltage level being those corresponding to said other pulses, means comparing each said level with the time signal pulse corresponding to the same fraction individual to the level and producing one type of energizing signal for each time signal pulse that does not exceed its level and a second type of energizing signal for each time signal pulse that exceeds its level, there being as many energizing signal as fractions, and means for applying all of said energizing signals to said switch means in said channel, the switch means being responsive to permit passage to said output pterminal means of an electrical signal derived from a desirable pulse when all of the energizing signals are of the first type, but said switch means being non-responsive and blocking any signals from passage to said output terminal means when any one of said energizing signals is of the second type.

8. A particle study apparatus including the combination of an axial trajectory sensor and a Coulter type of particle analyzing device, said axial trajectory sensor comprising: an input for receiving particle pulses from said analyzing device, means for measuring the duration of each particle pulse at a plurality of different predetermined fractional amplitudes, means for comparing each such measurement with a standard established for each fractional amplitude, and means for rejecting all particle pulses, all of whose measurements at said fractional amplitudes do not meet said standards.

9. A particle study apparatus according to claim 8 in which means are provided for establishing said standard on the basis of the measurement of the durations of previous particle pulses made at the particular fractional amplitude.

10. A particle study apparatus according to claim 8 which includes means providing a pair of fluid bodies, an aperture between the bodies with the bodies being insulated from one another electrically except through said aperture, one of said fluid bodies comprising a suspension of particles, means establishing an electric field in the aperture, means for flowing the sample suspension in the aperture to produce impedance changes in the aperture caused by the passage of particles, said aperture thereby defining a detection zone, means for detecting the impedance changes and producing said particle pulses, and means for coupling said detecting means to said sensor input.

* * * * *